June 24, 1952 — M. F. SELWYN — 2,601,563
RELIEF VALVE
Filed Oct. 30, 1948

MARLOWE F. SELWYN,
INVENTOR.

HUEBNER, BEEHLER, WORREL,
HERZIG & CALDWELL,
ATTORNEYS.

Patented June 24, 1952

2,601,563

UNITED STATES PATENT OFFICE 2,601,563

RELIEF VALVE

Marlowe F. Selwyn, Los Angeles, Calif., assignor to Selwyn-Landers Company, Los Angeles, Calif., a copartnership Application October 30, 1948, Serial No. 57,438

1 Claim. (Cl. 137—53)

The application relates to relief valves of a type particularly adaptable to installations where fluid pressures are in the higher ranges. Spring-loaded pressure relief valves have long been employed for use in connection with fluid systems under pressure, usually gas pressure, for the purpose of relieving pressure in a system in the event that the pressure builds up to an amount exceeding the safety limits of the system. Although these spring-loaded relief valves have been successful from the mechanical point of view even under heavy pressures, the tendency has been to employ material of considerable weight in order to insure sufficient ruggedness in the equipment and also more particularly to allow for an exhaust passage of sufficient capacity to accommodate the amount of gas needing to be exhausted when the relief valve operates. Relief valves of this general description although successful have been relatively high priced because of the number of parts and care needed to manufacture and assemble them and have further been usually made of such construction that the setting could be too easily altered by unskilled persons under circumstances which might readily result in setting up a dangerous condition in the system in which the relief valve is installed.

It is therefore among the objects of the invention to provide a new and improved relief valve having a large capacity for the exhaust of gas under pressure while at the same time maintaining a valve construction relatively light in weight and simple in mechanism.

Another object of the invention is to provide a new and improved spring-loaded relief valve of substantially minimum exterior dimensions having inner passages through the valve body and the valve element of such capacity that there is no restriction or constriction in the passage of gas under exhausting conditions.

Still another object of the invention is to provide a new and improved spring-loaded relief valve especially adapted to use under relatively high pressures wherein special means is provided for the retention of the spring so that when heavy springs are required the parts may move freely under the pressures for which the valve is set and so that the spring may be at all times maintained in proper position for a most efficient functioning.

A still further object of the invention is to provide a new and improved spring-loaded relief valve having relatively a minimum number of parts so designed that they are capable of being readily machined from bar stock and moreover permitting quick and efficient assembly, adjustment and disassembly.

Also among the important objects of the invention is to provide a new and improved spring-loaded relief valve, the adjusting parts of which are so constructed that adjustments can be readily made only by the use of tools specially adapted to the valve construction and which when once adjusted is adapted to have the adjusting portion of the valve locked into position so that the adjustment cannot readily be altered without obviously marring or disturbing the parts of the valve so that the alteration in adjustment may be easily detected.

With these and other objects in view, the invention consists in the construction, arrangement and combination of the various parts of the device whereby the objects contemplated are attained, as hereinafter set forth, pointed out in the appended claim and illustrated in the accompanying drawings.

Figure 1:
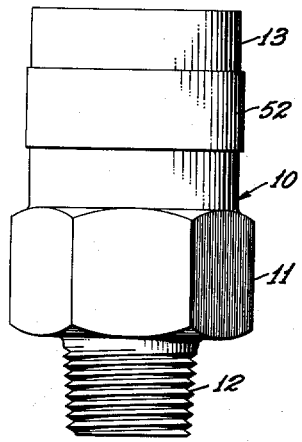
Figure 1 is a side elevational view of the assembled relief valve.
Figure 2:
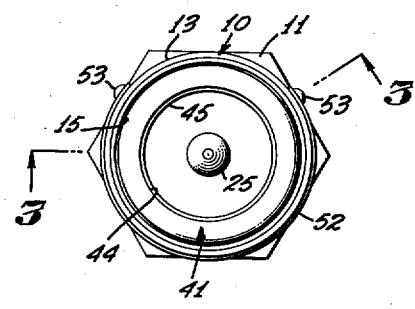
Figure 2 is a top view of the valve.

In the fabrication and assembly of relief valves which are capable of being effectively used under relatively high pressure, considerable care must be taken to be certain that the valve is not only safe but also to assure that the valve will operate at the pressure for which it is set. This means that the moving parts must be assured a free unrestricted movement to which they can quickly respond when called upon. When the spring pressure is heavy, sliding parts should be provided with a considerable area of contact so that a free sliding movement will always be assured. Because of the fact that use of heavy springs ordinarily necessitates relatively heavy construction, if economies are to be effected by use of lighter weight construction the relationship of the parts must be carefully engineered so that there is sufficient strength and ruggedness even though the sections be relatively light in weight. To make such a construction competitive from the point of view of cost by utilization of present-day machinery and methods points to a construction wherein the parts can be turned upon conventional screw machines with perhaps one or two milling machine operations to complete the fabrication. Therefore, to make a lightweight valve by such machining operations only necessary elements must be employed and these must be so constructed that all parts serve a utilitarian purpose and where possible some parts must be made to perform a double function.

In the embodiment chosen to illustrate the invention there is employed a valve body indicated generally by the reference character 10 which is designed to be turned from hexagonal rod stock. The body consists of a hexagonal portion 11 upon which a wrench hold can be secured, a pipe threaded portion 12 adapted to be screwed into a suitable aperture in a tank or other device, and an externally cylindrical portion 13.

Within the body is a smooth walled cylindrical chamber 14 having an outer threaded portion 15. At a bottom 16 of the chamber there is provided an upwardly extending annular projection 17 terminating in a valve seat 18. A passage 19 is adapted to communicate between the chamber 14 and the end of the body remote from the threaded portion 15.

Figure 4:
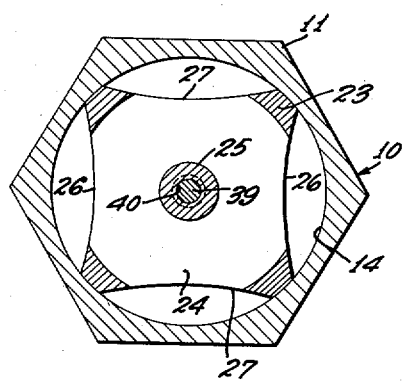
Figure 4 is a cross-sectional view taken on the line 4—4 of Figure 3.

Within the chamber there is positioned a valve element indicated generally by the reference character 20 consisting of a cup-like portion 21 having a narrow annular bottom 22 and a lower portion 23, the walls of which are substantially thicker than the walls of the cup-like portion 21. The lower portion has a solid bottom 24 and an inwardly extending central boss 25. As is more readily apparent in Figure 4 it will be noted that the lower portion has oppositely disposed arcuate milled recesses 26 and 27 which extend through the thickened wall portion 23 so as to provide passages between the interior of the valve element and the lower portion of the chamber 14. An opening 28 concentric with the annular bottom 22 of the cup-like element communicates between a hollow interior 29 of the cup-like portion and a hollow interior 30 of the lower portion of the valve element. As shown, the hollow interior 30 may be slightly greater in diameter than the diameter than the diameter of the passage 28. It will be noted from an examination of the exterior and interior cross-sectional dimensions of the valve element that this part also may be readily machined from bar stock to sufficient precision so that the outer wall of the valve element having a substantial length as shown may be adapted to freely slide in an endwise direction within the smooth walled interior of the chamber 14. The full extent of the movement need not be great but only sufficient to permit a full flow of gas under pressure past the valve seat 18.

Cooperating with the valve seat is a valve facing 35 enclosed within a flange or rim 36 machined upon the solid bottom 24. For holding the valve facing in place there may be provided a washer 37 having a spacing flange 38 thereon penetrating a hole in the center of the valve facing. The washer and valve are shown as being secured in place by a screw 39 extending into a threaded aperture 40 in the boss 25.

Figure 3:
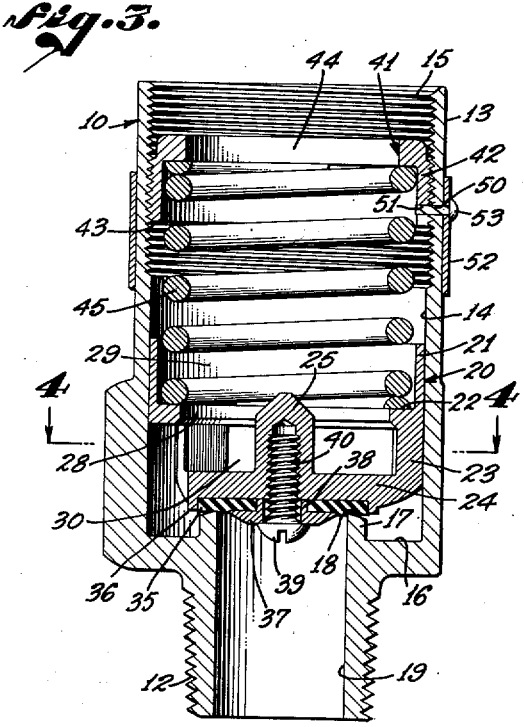
Figure 3 is a longitudinal sectional view of the valve taken on the line 3—3 of Figure 2.

In order to hold the valve element in seated position there is provided a spring keeper ring 41, cup-like in form, having a relatively thin wall 42 thereof threaded with threads corresponding to the outer threaded end 15 of the valve body and a relatively narrow annular bottom 43. A smooth walled passage 44 communicates between the interior of the keeper ring and the exterior. Also, as clearly shown in Figure 3, a coiled compression spring 45 of relatively heavy gauge is confined between the spring keeper ring and the cup-like portion of the valve element. As shown, the inside diameter of the coiled spring is slightly less than the inside diameter of either the passage 44 or the passage 28. The outside diameter of the spring is made such that the spring has a close sliding fit within the wall 42 of the keeper ring and the wall of the cup-like portion 21 of the valve element.

When the valve is assembled the valve element is dropped into the chamber 14 where the valve facing 35 rests upon the valve seat 18. The coiled compression spring 45 is then placed in position and the keeper ring 41 threaded into the open end of the valve body by use of a tool adapted to expand into a position firmly gripping the smooth surface of the passage 44. The keeper ring is screwed into the valve body a distance sufficient to place pressure on the spring to an extent capable of establishing a definite relief point at which the valve will operate.

So that the setting of the spring may not be disturbed after the spring keeper has been properly positioned, holes 50 are drilled through the valve body and extended to form holes 51 in alignment therewith in the threaded wall 42 of the keeper ring. A legend plate 52 is then applied around the cylindrical surface of the valve body and drive screws 53 having plain heads are driven through appropriate apertures in the legend plate and through the holes 50 and 51. By this operation the legend plate is firmly secured to the valve body and by the same operation the position of the keeper ring is fixed with relation to the valve body and the coiled compression spring 45. Once assembled it will not be possible to change the setting of the keeper ring and the spring without digging both drive screws out of the valve body and keeper ring and then applying a special tool, not readily available to the average mechanic, to alter the setting of the valve. In the event that such an inadvertent resetting should be made, a marring of the valve, not easily avoided, will be sufficiently apparent so that the maker of the valve by whom the original setting was made will be immediately able to detect it. In the event that the valve in such event should fail to perform properly, the responsibility of the maker may not then be challenged.

An examination of the structure just described will reveal that only three parts need be specially machined, namely, the valve body, the valve element and the keeper ring and that these parts may be completely machined by relatively few tool operations. All of the operations with the exception of the milling of the recesses 26 and 27 are adapted to be made on commercial lathes or screw machines. Conventional pieces in the nature of plates, screws and washers complete the assembly together with a coiled compression spring of a type readily available on the open market. Only two surfaces need be held to careful tolerance to provide a free sliding movement of the valve element within the chamber 14. The valve in assembled form is thus capable of quick and effective opening movement at the pressure for which it is set when assembled and the structure described is one effectively preventing inadvertent resetting except under authorized circumstances.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent devices.

Having described my invention, what I claim as new and desire to secure by Letters Patent is:

A relief valve comprising a valve body having a cylindrical chamber including a threaded opening at one end, a valve seat at the bottom of the chamber spaced inwardly from the wall thereof and a passage through the valve seat to the other end of the valve body, a valve element comprising a double cup-like member having a bottom including a valve facing on the exterior cooperable with said valve seat, an undercut hollow interior of smaller diameter adjacent the bottom, a hollow interior of greater diameter adjacent the rim forming a shoulder between said hollow interiors and a central opening between said hollow interiors within said shoulder, said cup-like member having straight side wall portions extending from the rim to the bottom adapted for sliding contact with the interior of the cylindrical chamber, the wall of the cup-like member adjacent the hollow interior of smaller diameter having oppositely disposed arcuate recesses adjoining said straight side wall portions at opposite sides providing passages from the chamber bottom into the interior of the cup-like member, a spring keeper ring threadedly mounted in said threaded opening, said keeper ring having a shoulder and a central opening in the bottom corresponding in diameter to the shoulder and opening in the upper part of the cup-like member, and a compression coil spring engaging said shoulders and surrounding said open bottoms.

MARLOWE F. SELWYN.

REFERENCES CITED

The following references are of record in the file of this patent:

UNITED STATES PATENTS

| Number | Name | Date |
|---|---|---|
| 1,740,420 | Friedman | Dec. 17, 1929 |
| 1,743,350 | Hopkins | Jan. 14, 1930 |
| 2,005,931 | Buttner | June 25, 1935 |
| 2,021,771 | Farmer | Nov. 19, 1935 |
| 2,254,209 | Buttner | Sept. 2, 1941 |
| 2,449,119 | Holicer | Sept. 14, 1948 |
| 2,479,737 | Ganetson | Aug. 23, 1949 |